(12) United States Patent
Yuan

(10) Patent No.: US 10,447,057 B2
(45) Date of Patent: Oct. 15, 2019

(54) POWER MATCHING METHOD OF MATRIX POWER DISTRIBUTION CHARGING SYSTEM

(71) Applicant: XI'AN TGOOD INTELLIGENT CHARGING TECHNOLOGY CO. LTD, Xi'an, Shaanxi (CN)

(72) Inventor: Qingmin Yuan, Shaanxi (CN)

(73) Assignee: XI'AN TGOOD INTELLIGENT CHARGING TECHNOLOGY CO. LTD, Xi'an, Shaanxi (CN)

(*) Notice: Subject to any disclaimer, the term of this patent is extended or adjusted under 35 U.S.C. 154(b) by 114 days.

(21) Appl. No.: 15/741,291

(22) PCT Filed: Aug. 26, 2016

(86) PCT No.: PCT/CN2016/096809
§ 371 (c)(1),
(2) Date: Jan. 2, 2018

(87) PCT Pub. No.: WO2017/036349
PCT Pub. Date: Mar. 9, 2017

(65) Prior Publication Data
US 2018/0205235 A1    Jul. 19, 2018

(30) Foreign Application Priority Data

Sep. 1, 2015 (CN) .......................... 2015 1 0551423

(51) Int. Cl.
*B60L 53/67* (2019.01)
*B60L 53/60* (2019.01)
*H02J 7/00* (2006.01)

(52) U.S. Cl.
CPC .............. *H02J 7/007* (2013.01); *B60L 53/60* (2019.02); *B60L 53/67* (2019.02); *H02J 7/00* (2013.01);
(Continued)

(58) Field of Classification Search
CPC ........ H02J 7/0027; B60L 53/10; B60L 53/14; B60L 53/60; B60L 53/67
(Continued)

(56) References Cited

U.S. PATENT DOCUMENTS 6,081,205 A * 6/2000 Williams ............... B60L 3/0069
340/932.2
9,209,639 B2 * 12/2015 Nishikawa ............ H01M 10/48
(Continued)

*Primary Examiner* — Richard V Muralidar

(57) ABSTRACT

A matrix power distribution charging system includes at least two DC modules and a plurality of PDUs, wherein the DC modules and the PDUs are respectively connected to a CCU; wherein a power matching method includes steps of: sending orders to the DC modules by the CCU after the matrix power distribution charging system is turned on, so as to order the DC modules to output different constant voltage values; comparing the front end voltages of the switch devices with the constant voltage values outputted by the DC modules for determining a corresponding relation between the switch devices and the DC modules; finally, logically computing by the CCU according to an actual power requirement of the parking space and sending control orders to the PDUs for a certain DC module output combination, in such a manner that the PDUs correctly outputs a certain power.

7 Claims, 3 Drawing Sheets

(52) U.S. Cl.
CPC ......... *H02J 7/0027* (2013.01); *Y02T 10/7005* (2013.01)

(58) Field of Classification Search
USPC ........................................................ 320/109
See application file for complete search history.

(56) References Cited

U.S. PATENT DOCUMENTS

| | | | |
|---|---|---|---|
| 9,290,103 B2* | 3/2016 | Bianco | B60L 11/1824 |
| 10,065,519 B1* | 9/2018 | Appelbaum | B60L 53/67 |
| 10,150,380 B2* | 12/2018 | Vaughan | B60L 11/1844 |
| 2017/0246961 A1* | 8/2017 | Lee | B60L 11/1824 |

* cited by examiner

POWER MATCHING METHOD OF MATRIX POWER DISTRIBUTION CHARGING SYSTEM

CROSS REFERENCE OF RELATED APPLICATION

This is a U.S. National Stage under 35 U.S.C 371 of the International Application PCT/CN2016/096809, filed Aug. 26, 2016, which claims priority under 35 U.S.C. 119(a-d) to CN 201510551423.7, filed Sep. 1, 2015.

BACKGROUND OF THE PRESENT INVENTION

Field of Invention

The present invention relates to a technical field of electric vehicle charging, and more particularly to a power matching method of a matrix power distribution charging system.

Description of Related Arts

With social development and increased awareness of environmental protection, electric vehicles are gradually favored due to vehicle power supply as the driving force to solve fuel vehicle emission pollution, high energy consumption and other problems. People are very concerned about the problem of electric vehicle charging, which is related to the promotion and popularization of electric vehicles.

In actual use, during charging with a matrix structure, a DC module position is often changed in the cabinet due to DC module maintenance. The cabinet usually comprises a plurality of DC modules, so when positions of the DC modules are changed, a plurality of switching devices in PDU (power distribution unit) cannot be correctly directed to the actual corresponding power modules, leading to charge failure. In the end, connection relationship between the PDU and the DC modules must be manually detected and adjusted, affecting normal charging of the charge station.

SUMMARY OF THE PRESENT INVENTION

An object of the present invention is to provide a power matching method of a matrix power distribution charging system, for solving charging failure due to incorrect matching between a power distribution unit and direct current modules in the matrix power distribution charging system.

Accordingly, in order to accomplish the above objects, the present invention provides:

a power matching method of a matrix power distribution charging system, wherein the matrix power distribution charging system comprises at least two DC (direct current) modules and a plurality of PDUs (powder distribution unit), wherein the DC modules and the PDUs are respectively connected to a CCU (charge control unit); each of the PDUs comprises switch devices whose amount equals to an amount of the DC modules, and all the DC modules are connected to each of the PDUs through one of the switch devices; each of the PDUs corresponds to a parking space and is used as a charging source;

wherein the power matching method comprises steps of: sending orders to the DC modules by the CCU after the matrix power distribution charging system is turned on, so as to order the DC modules to output different constant voltage values; meanwhile, sampling front end voltages of the switch devices by the PDUs through a sampling circuit and sending to the CCU; and comparing the front end voltages of the switch devices with the constant voltage values outputted by the DC modules for determining a corresponding relation between the switch devices and the DC modules; finally, logically computing by the CCU according to an actual power requirement of the parking space and sending control orders to the PDUs, so as to switch on or off the switch devices of the PDUs for a certain DC module output combination, in such a manner that the PDUs correctly outputs a certain power.

Preferably, the power matching method specifically comprises steps of:

(1) broadcasting a state order by the CCU for indicating that the switch devices begin to match with the DC modules;

(2) sending messages to each of the DC modules one by one by the CCU to order the DC modules to output the constant voltage values; meanwhile, receiving the messages by the PDUs, in such a manner that the PDUs know the constant voltage values to be outputted by the DC modules;

(3) respectively outputting the constant voltage values by the DC modules according to the messages from the CCU;

(4) sampling the front end voltages of the switch devices by the PDUs through the sampling circuit, comparing the front end voltages of the switch devices with the constant voltage values outputted by the DC modules for finding the switch devices and the DC modules with similar output voltage values, and establishing an one-to-one corresponding relation;

(5) sending a matching success message to the CCU by each of the PDUs if matching succeeds after the corresponding relation is established between the switch devices and the DC modules; or sending a matching failure message to the CCU if matching fails; and (6) broadcasting a matching complete state to the matrix power distribution charging system when the CCU receives all matching messages of the PDUs.

Preferably, the switch devices are switch relays; each of the PDUs further comprises an AD (analog-digital) sampling circuit and an MCU (micro controller unit); the switch relays are switched on or off by the MCU, and front voltages of the switch relays are sampled by the AD sampling circuit.

Preferably, the DC modules and the PDUs are respectively connected to and communicate with the CCU by a CAN (controller area network) bus.

Preferably, the CCU adopts an MCU.

The present invention provides a matrix switch address distribution method, which solves a switch address distribution problem of matrix charging.

Advantageous effects of the present invention are as follows:

(1) The matrix power distribution charging system of the present invention comprises at least two DC modules and a plurality of PDUs, wherein the DC modules and the PDUs are respectively connected to the CCU. With existing system resources, each switch device of each of the PDUs automatically matches with each of the DC modules, without using additional dedicated resources (e.g. DIP switches) to achieve matching operation.

(2) The automatic matching is result-oriented, so there is no strict requirement on wiring between the DC modules and the PDUs, and matching can succeed even if misalignment wiring occurs.

(3) With the matrix switch connection, a charging parking space can be connected to all the DC modules via a corresponding switch device, so as to achieve the wideamplitude flexible power distribution between DC module resources and the charging parking spaces.

DETAILED DESCRIPTION OF THE PREFERRED EMBODIMENT

Figure 1:
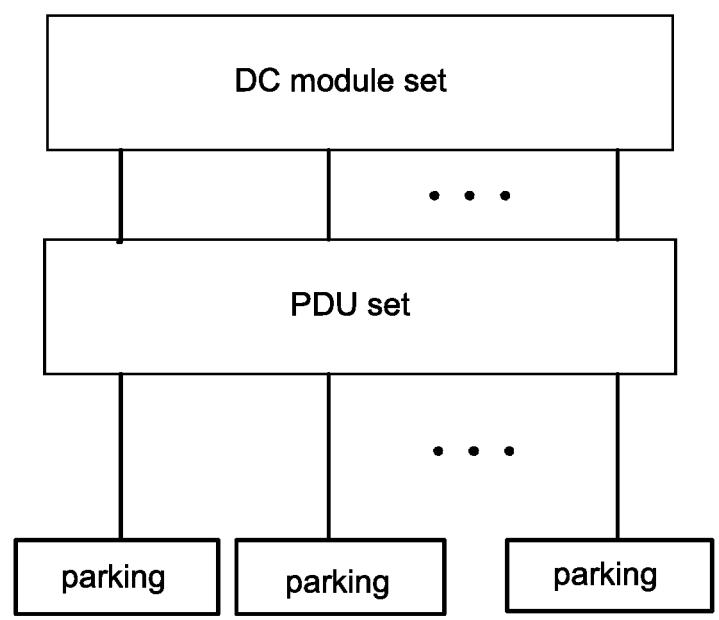
FIG. 1 is a sketch view of a matrix power distribution charging system according to the present invention.

Referring to the drawings, the present invention will be further illustrated.

Figure 2:
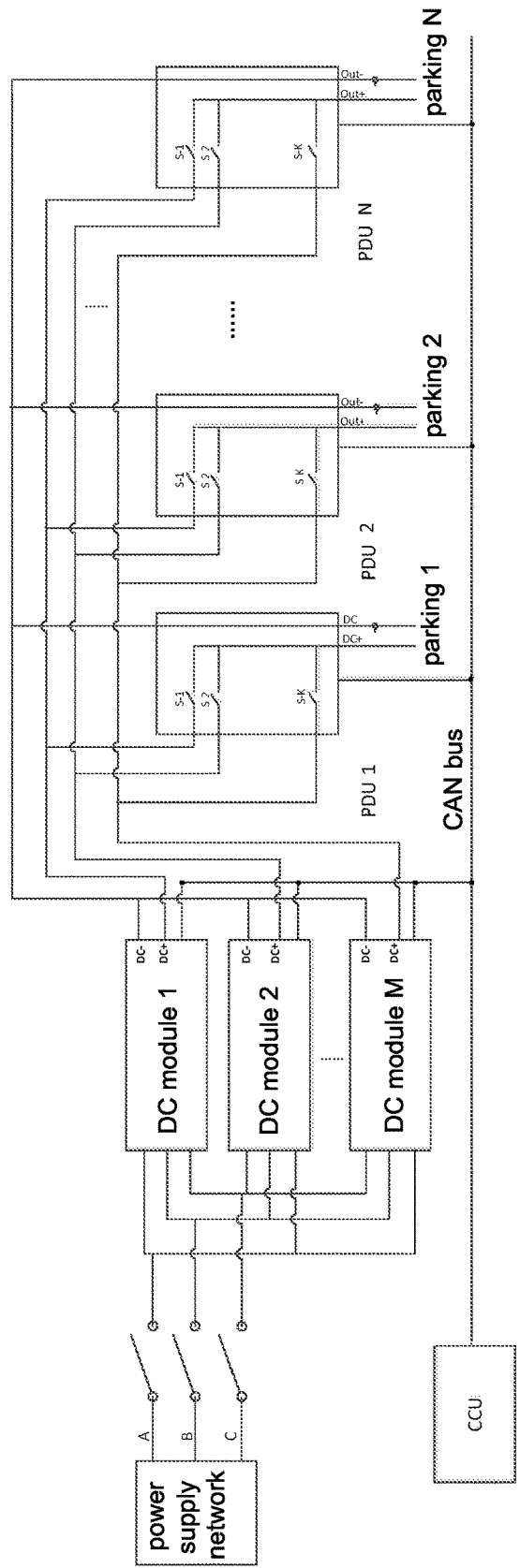
FIG. 2 is a schematic view of the matrix power distribution charging system according to the present invention.
Figure 3:
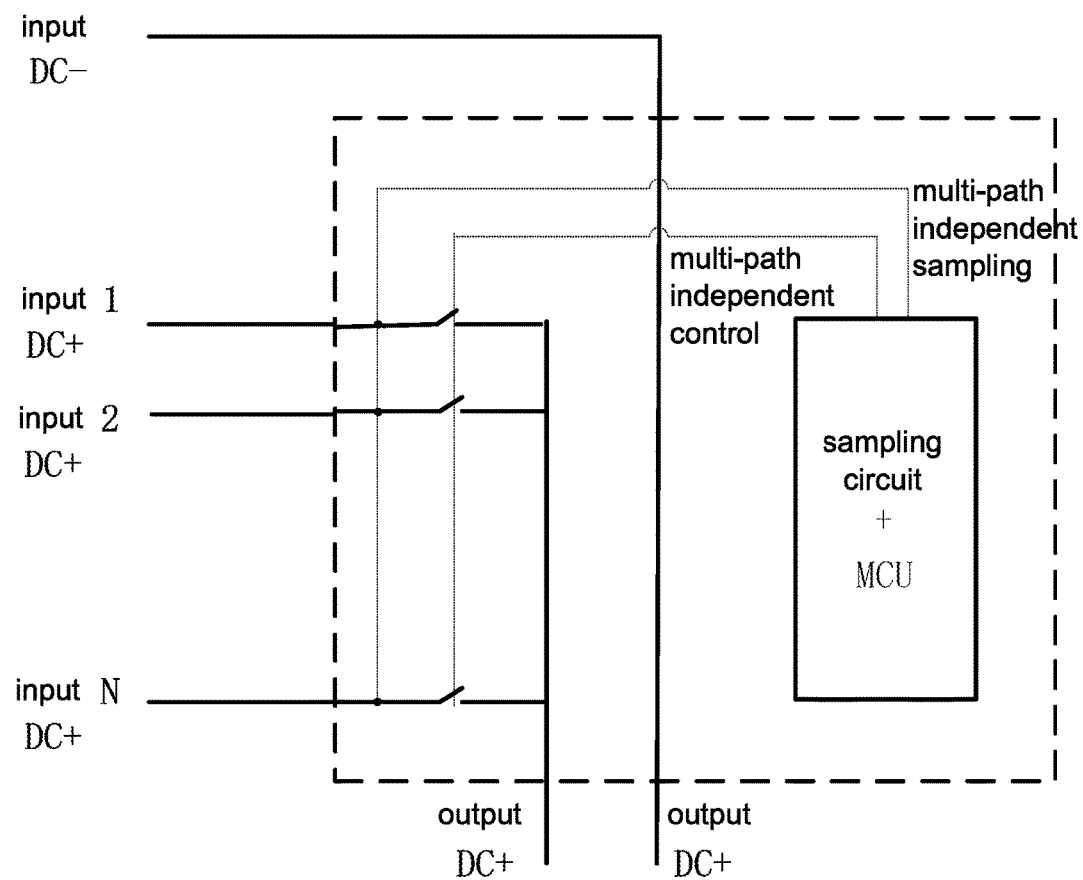
FIG. 3 is a schematic view of a PDU control system according to the present invention.

Referring to FIGS. 1-3, three-phase AC voltage is inputted into a charging box from a power supply network, and is converted into DC voltage for a DC module set. The DC module set comprises a plurality of DC modules, and outputs a plurality of DC power branches to PDUs. The DC modules and the PDUs are respectively connected to a CCU, and each of the PDUs comprises switch devices whose amount equals to an amount of the DC modules, and all the DC modules are connected to each of the PDUs through one of the switch devices; each of the PDUs corresponds to a parking space and is used as a charging source.

According to the method, PDU refers to power distribution unit.

According to the method, CCU refers to charge control unit.

According to the method, the DC modules output DC positive voltages, and are respectively connected to the PDUs in parallel, wherein the DC modules are switched on or off by corresponding switch relays.

Referring to FIG. 2, the present invention comprises at least two DC modules or more, and at least two PDUs or more, but an amount of the PDUs must equal to an amount of the DC modules.

Referring to FIG. 3, the switch devices are switch relays; each of the PDUs further comprises an AD sampling circuit and an MCU; the switch relays are switched on or off by the MCU, and front voltages of the switch relays are sampled by the AD sampling circuit.

The CCU adopts an MCU.

The power matching method comprises steps of: sending orders to the DC modules by the CCU after the matrix power distribution charging system is turned on, so as to order the DC modules to output different constant voltage values; meanwhile, sampling front end voltages of the switch relays (front end voltages of the DC modules) by the PDUs through a sampling circuit and sending to the CCU; and comparing the front end voltages of the switch relays with the constant voltage values outputted by the DC modules for determining a corresponding relation between the switch relays and the DC modules;

then logically computing by the CCU according to an actual power requirement of the parking space and sending control orders to the PDUs, so as to switch on or off the switch relays of the PDUs for a certain DC module output combination, in such a manner that the PDUs correctly outputs a certain power.

The power matching method of the matrix power distribution charging system specifically comprises steps as follows.

Referring to FIG. 2, the CCU, PDUs and DC modules in the system communicate with each other through a CAN bus, and respectively have a unique address ID distributed in different address areas. For example, a CCU address range is 0-4, a PDU address range is 5-20, and a DC module address range is 21-50, wherein messages are sent and received through the address ID. During operation, the CCU manages the whole operation progress. Establishing a corresponding relation between the switch relays of the PDUs and each of the DC modules is started by the CCU.

(1) broadcasting a state order by the CCU for indicating that the switch devices begin to match with the DC modules;

(2) sending messages to each of the DC modules (ID number 21-50) one by one by the CCU, wherein the messages order the DC modules to output the constant voltage values (which are different from each other); meanwhile, receiving the messages by the PDUs, in such a manner that the PDUs know the constant voltage values Vcomm to be outputted by the DC modules;

(3) respectively outputting the constant voltage values by the DC modules according to the messages from the CCU;

(4) sampling voltages Vad in front of the switch relays by the PDUs through the AD sampling circuit, and processing the voltages Vad with filtering delay; comparing the voltages Vad with the constant voltage values Vcomm outputted by the DC modules for finding the switch relays and the DC modules with similar output voltage values, and establishing an one-to-one corresponding relation, in such a manner that ID numbers of the DC modules are corresponding to ID numbers of the switch relays of the PDUs;

(5) sending a matching success message to the CCU by each of the PDUs if matching succeeds after the corresponding relation is established between the switch relays and the DC modules; or sending a matching failure message to the CCU if matching fails; and (6) broadcasting a matching complete state to the matrix power distribution charging system when the CCU receives all matching messages of the PDUs.

In the following example for illustrating the present invention, three DC modules and three PDUs are used.

Through the CAN bus, the CUU orders the DC modules to output certain voltages, assuming a DC module 1 is set to 40V, a DC module 2 is set to 80V and a DC module 3 is set to 60V.

For instance, if a sample voltage of a switch relay S-1 of a PDU-1 is 60V, then PDU-1 corresponds to the DC module 3, while sample voltages of S-1 of PDU-2 and S-1 of PDU-3 are both 0.

If a sample voltage of a switch relay S-2 of a PDU-2 is 40V, then PDU-2 corresponds to the DC module 1, while sample voltages of S-2 of PDU-1 and S-2 of PDU-3 are both 0.

If a sample voltage of a switch relay S-3 of a PDU-3 is 80V, then PDU-3 corresponds to the DC module 2, while sample voltages of S-3 of PDU-1 and S-3 of PDU-2 are both 0.

Therefore, in the example, the DC module 1 corresponds to the PDU-2 and the S-2. The DC module 2 corresponds to the PDU-3 and the S-3. The DC module 3 corresponds to the PDU-1 and the S-1.

After determining the corresponding relation between the switch relays and the DC modules, a mapping relation is established. When a vehicle is charging in a parking space, the CCU controls a switch relay state of the PDUs, so as to control an output combination of the DC modules for correctly charging.

What is claimed is:

1. A power matching method of a matrix power distribution charging system, wherein the matrix power distribution charging system comprises at least two DC (direct current) modules and a plurality of PDUs (powder distribution unit), wherein the DC modules and the PDUs are respectively connected to a CCU (charge control unit); each of the PDUs comprises switch devices whose amount equals to an amount of the DC modules, and all the DC modules are connected to each of the PDUs through one of the switch devices; each of the PDUs corresponds to a parking space and is used as a charging source;

wherein the power matching method comprises steps of: sending orders to the DC modules by the CCU after the matrix power distribution charging system is turned on, so as to order the DC modules to output different constant voltage values; meanwhile, sampling front end voltages of the switch devices by the PDUs through a sampling circuit and sending to the CCU; and comparing the front end voltages of the switch devices with the constant voltage values outputted by the DC modules for determining a corresponding relation between the switch devices and the DC modules; finally, logically computing by the CCU according to an actual power requirement of the parking space and sending control orders to the PDUs, so as to switch on or off the switch devices of the PDUs for a certain DC module output combination, in such a manner that the PDUs correctly outputs a certain power.

2. The power matching method, as recited in claim 1, specifically comprising steps of:
   (1) broadcasting a state order by the CCU for indicating that the switch devices begin to match with the DC modules;
   (2) sending messages to each of the DC modules one by one by the CCU to order the DC modules to output the constant voltage values; meanwhile, receiving the messages by the PDUs, in such a manner that the PDUs know the constant voltage values to be outputted by the DC modules;
   (3) respectively outputting the constant voltage values by the DC modules according to the messages from the CCU;
   (4) sampling the front end voltages of the switch devices by the PDUs through the sampling circuit, comparing the front end voltages of the switch devices with the constant voltage values outputted by the DC modules for finding the switch devices and the DC modules with similar output voltage values, and establishing an one-to-one corresponding relation;
   (5) sending a matching success message to the CCU by each of the PDUs if matching succeeds after the corresponding relation is established between the switch devices and the DC modules; or sending a matching failure message to the CCU if matching fails; and
   (6) broadcasting a matching complete state to the matrix power distribution charging system when the CCU receives all matching messages of the PDUs.

3. The power matching method, as recited in claim 1, wherein the switch devices are switch relays; each of the PDUs further comprises an AD (analog-digital) sampling circuit and an MCU (micro controller unit); the switch relays are switched on or off by the MCU, and front voltages of the switch relays are sampled by the AD sampling circuit.

4. The power matching method, as recited in claim 2, wherein the switch devices are switch relays; each of the PDUs further comprises an AD (analog-digital) sampling circuit and an MCU (micro controller unit); the switch relays are switched on or off by the MCU, and front voltages of the switch relays are sampled by the AD sampling circuit.

5. The power matching method, as recited in claim 1, wherein the DC modules and the PDUs are respectively connected to and communicate with the CCU by a CAN (controller area network) bus.

6. The power matching method, as recited in claim 2, wherein the DC modules and the PDUs are respectively connected to and communicate with the CCU by a CAN (controller area network) bus.

7. The power matching method, as recited in claim 1, wherein the CCU adopts an MCU.

* * * * *